US009519934B2

(12) United States Patent
Calman et al.

(10) Patent No.: US 9,519,934 B2
(45) Date of Patent: Dec. 13, 2016

(54) RESTRICTED ACCESS TO ONLINE BANKING

(71) Applicant: BANK OF AMERICA CORPORATION, Charlotte, NC (US)

(72) Inventors: Matthew A. Calman, Charlotte, NC (US); William E. Kelley, Charlotte, NC (US); Chris Purvis, Waxhaw, NC (US); Dipika Jain, Charlotte, NC (US); Michael E. Toth, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 509 days.

(21) Appl. No.: 13/946,658

(22) Filed: Jul. 19, 2013

(65) Prior Publication Data

US 2015/0026026 A1      Jan. 22, 2015

(51) Int. Cl.
*G06Q 40/00* (2012.01)
*G06Q 40/02* (2012.01)
(Continued)

(52) U.S. Cl.
CPC .............. *G06Q 40/02* (2013.01); *G06Q 20/32* (2013.01); *G06Q 20/108* (2013.01);
(Continued)

(58) Field of Classification Search
CPC .... G06Q 20/32; G06Q 30/0601; G06Q 20/40; G06Q 20/322; G06Q 20/3224; G06Q 20/405; G06Q 40/00; G06Q 20/4037; G06Q 20/425; G06Q 30/00; G06Q 20/3221; G06Q 20/108; G06Q 20/4016; G06Q 30/06; G06Q 30/0633; G06Q 20/325; G06Q 20/4014; G06Q 20/403
(Continued)

(56) References Cited

U.S. PATENT DOCUMENTS

| 4,960,981 A | 10/1990 | Benton et al. |
| 5,416,903 A | 5/1995 | Malcolm |
| 5,699,244 A | 12/1997 | Clark, Jr. et al. |
| 5,861,882 A | 1/1999 | Sprenger et al. |
| 5,889,863 A | 3/1999 | Weber |
| 5,930,764 A | 7/1999 | Melchione et al. |
| 6,073,119 A | 6/2000 | Bornemisza-Wahr et al. |
| 6,354,490 B1 | 3/2002 | Weiss et al. |
| D455,436 S | 4/2002 | Cassano et al. |
| 6,445,682 B1 | 9/2002 | Weitz |
| 6,505,238 B1 | 1/2003 | Tran |

(Continued)

FOREIGN PATENT DOCUMENTS

WO    WO-2012/067640 A1    5/2012

OTHER PUBLICATIONS

Budnitz, M. E. (2013). Mobile banking: Gaps in the law impede risk assessment. Banking & Financial Services Policy Report, 32(5), 11(10). Retrieved from http://dialog.proquest.com/professional/docview/1355667653?accountid=142257 on Oct. 1, 2016.*

(Continued)

*Primary Examiner* — Kito R Robinson
(74) *Attorney, Agent, or Firm* — Michael A. Springs; Moore & Van Allen PLLC; Peter B. Stewart

(57) ABSTRACT

Disclosed is a system and associated method for restricting access to a customer's online banking account. The system typically includes a processor, a memory, and an online banking module stored in the memory. The module is typically configured for determining that a computing device has initiated a first online banking transaction associated with the customer's online banking account. If the first online banking transaction is within a first restricted transaction definition and if the computing device is not enrolled with the customer's online banking account, geographic location information associated with the computing device and geographic location information associated with a first mobile device enrolled with the customer's account are received. The module determines whether the location of the computing device is proximate to a predefined location and/or whether the location of the computing device is proximate to the location of the first mobile device.

9 Claims, 7 Drawing Sheets

(51) Int. Cl.
  *G06Q 20/40* (2012.01)
  *G06Q 20/32* (2012.01)
  *G06Q 20/42* (2012.01)
  *G06Q 30/06* (2012.01)
  *G06Q 20/10* (2012.01)
  *G06Q 30/00* (2012.01)

(52) U.S. Cl.
  CPC ......... *G06Q 20/322* (2013.01); *G06Q 20/325* (2013.01); *G06Q 20/3221* (2013.01); *G06Q 20/3224* (2013.01); *G06Q 20/40* (2013.01); *G06Q 20/403* (2013.01); *G06Q 20/405* (2013.01); *G06Q 20/4014* (2013.01); *G06Q 20/4016* (2013.01); *G06Q 20/4037* (2013.01); *G06Q 20/425* (2013.01); *G06Q 30/00* (2013.01); *G06Q 30/06* (2013.01); *G06Q 30/0601* (2013.01); *G06Q 30/0633* (2013.01); *G06Q 40/00* (2013.01)

(58) Field of Classification Search
  USPC .......................................................... 705/65
  See application file for complete search history.

(56) References Cited

U.S. PATENT DOCUMENTS

| | | | |
|---|---|---|---|
| 6,647,372 B1 | 11/2003 | Brady et al. | |
| 6,760,414 B1 | 7/2004 | Schurko et al. | |
| 6,910,020 B2 | 6/2005 | Oyama et al. | |
| 7,084,758 B1* | 8/2006 | Cole | G06Q 10/109 340/309.16 |
| 7,100,200 B2 | 8/2006 | Pope et al. | |
| D545,832 S | 7/2007 | Armendariz | |
| 7,305,470 B2 | 12/2007 | Tom et al. | |
| 7,321,775 B2 | 1/2008 | Maanoja | |
| D567,249 S | 4/2008 | Gunn et al. | |
| 7,378,939 B2* | 5/2008 | Sengupta | H04M 1/67 340/5.53 |
| D578,134 S | 10/2008 | Jasinski | |
| D579,459 S | 10/2008 | Tomizawa et al. | |
| 7,464,057 B2 | 12/2008 | Cole et al. | |
| 7,478,143 B1 | 1/2009 | Friedman et al. | |
| 7,478,338 B2 | 1/2009 | Yanchar et al. | |
| D586,352 S | 2/2009 | Park et al. | |
| 7,499,875 B1 | 3/2009 | May et al. | |
| 7,519,036 B2 | 4/2009 | Zhang | |
| 7,571,140 B2 | 8/2009 | Weichert et al. | |
| D599,813 S | 9/2009 | Hirsch | |
| 7,751,829 B2 | 7/2010 | Masuoka et al. | |
| 7,766,223 B1 | 8/2010 | Mello et al. | |
| 7,782,302 B2 | 8/2010 | Lee et al. | |
| 7,788,151 B2 | 8/2010 | Pizzi et al. | |
| 7,813,983 B2 | 10/2010 | Wottowa et al. | |
| 7,819,307 B2 | 10/2010 | Lyons et al. | |
| 7,857,212 B1 | 12/2010 | Matthews | |
| 7,899,006 B2* | 3/2011 | Boyd | G01S 5/021 370/328 |
| 7,949,603 B1 | 5/2011 | Cao et al. | |
| 7,966,496 B2 | 6/2011 | Ellmore | |
| 8,069,084 B2 | 11/2011 | Mackouse | |
| 8,077,688 B2 | 12/2011 | Zhang | |
| 8,136,148 B1 | 3/2012 | Chayanam et al. | |
| 8,150,387 B2 | 4/2012 | Klein et al. | |
| 8,176,077 B2* | 5/2012 | Stevens | G06F 17/3087 707/782 |
| 8,185,472 B1 | 5/2012 | Boyd et al. | |
| 8,186,578 B1* | 5/2012 | Block | G06Q 20/18 235/379 |
| 8,255,981 B2 | 8/2012 | Pearson et al. | |
| 8,295,898 B2 | 10/2012 | Ashfield et al. | |
| 8,320,901 B2 | 11/2012 | Klein et al. | |
| 8,374,324 B2 | 2/2013 | Suryanarayana et al. | |
| 8,381,975 B2* | 2/2013 | Davila | G06Q 20/042 235/375 |
| 8,452,693 B2 | 5/2013 | Shah et al. | |
| 8,479,978 B1* | 7/2013 | Miller | G07F 19/20 235/379 |
| 8,555,355 B2* | 10/2013 | Rathbun | H04L 9/3213 726/11 |
| 8,788,389 B1* | 7/2014 | Fernandes | G06Q 40/02 705/35 |
| 9,112,994 B2* | 8/2015 | Yamada | G06F 3/0482 |
| 2002/0059384 A1 | 5/2002 | Kaars | |
| 2002/0120582 A1 | 8/2002 | Elston et al. | |
| 2003/0101116 A1 | 5/2003 | Rosko et al. | |
| 2003/0182194 A1 | 9/2003 | Choey et al. | |
| 2003/0190921 A1 | 10/2003 | Stewart | |
| 2003/0204460 A1 | 10/2003 | Robinson et al. | |
| 2004/0061720 A1 | 4/2004 | Weber | |
| 2004/0122736 A1 | 6/2004 | Strock et al. | |
| 2004/0158549 A1* | 8/2004 | Matena | G06F 11/2097 |
| 2005/0097000 A1 | 5/2005 | Freishtat et al. | |
| 2006/0089908 A1 | 4/2006 | Keohane | |
| 2006/0153173 A1 | 7/2006 | Beck et al. | |
| 2006/0194592 A1 | 8/2006 | Clough | |
| 2006/0195816 A1 | 8/2006 | Grandcolas et al. | |
| 2006/0235953 A1 | 10/2006 | Meier | |
| 2007/0061254 A1 | 3/2007 | Blunck et al. | |
| 2007/0133487 A1 | 6/2007 | Wang et al. | |
| 2007/0136573 A1 | 6/2007 | Steinberg | |
| 2007/0219865 A1 | 9/2007 | Leining | |
| 2007/0265948 A1 | 11/2007 | Maiorino et al. | |
| 2007/0288357 A1 | 12/2007 | Holman et al. | |
| 2007/0288373 A1 | 12/2007 | Wilkes | |
| 2008/0046367 A1* | 2/2008 | Billmaier | G06Q 20/20 705/44 |
| 2008/0082351 A1 | 4/2008 | Kelley-Hrabe et al. | |
| 2008/0091600 A1 | 4/2008 | Egnatios et al. | |
| 2008/0156870 A1 | 7/2008 | Niedermeyer | |
| 2008/0162338 A1 | 7/2008 | Samuels et al. | |
| 2008/0215377 A1 | 9/2008 | Wottowa et al. | |
| 2008/0227471 A1* | 9/2008 | Dankar | G06Q 20/3224 455/456.6 |
| 2008/0243586 A1 | 10/2008 | Dohring et al. | |
| 2008/0306848 A1 | 12/2008 | Bartholomew et al. | |
| 2009/0012898 A1* | 1/2009 | Sharma | G06Q 20/24 705/44 |
| 2009/0024526 A1* | 1/2009 | Erickson | G06Q 20/40 705/44 |
| 2009/0048916 A1* | 2/2009 | Nuzum | G06Q 20/06 705/14.14 |
| 2009/0181665 A1 | 7/2009 | Sater et al. | |
| 2009/0206157 A1 | 8/2009 | Heffez et al. | |
| 2009/0271287 A1 | 10/2009 | Halpern | |
| 2009/0276321 A1 | 11/2009 | Krikorian et al. | |
| 2009/0292595 A1 | 11/2009 | Tonnison et al. | |
| 2009/0313106 A1 | 12/2009 | Taylor et al. | |
| 2009/0328052 A1 | 12/2009 | Nguyen | |
| 2010/0005024 A1 | 1/2010 | Schmitz et al. | |
| 2010/0006642 A1* | 1/2010 | Boutcher | G06Q 20/341 235/379 |
| 2010/0024017 A1 | 1/2010 | Ashfield et al. | |
| 2010/0042542 A1 | 2/2010 | Rose et al. | |
| 2010/0100480 A1 | 4/2010 | Altman et al. | |
| 2010/0138316 A1 | 6/2010 | Connors et al. | |
| 2010/0153269 A1* | 6/2010 | McCabe | G06Q 20/40 705/44 |
| 2010/0161467 A1 | 6/2010 | Ageenko et al. | |
| 2010/0169151 A1 | 7/2010 | Xu | |
| 2010/0241564 A1 | 9/2010 | Miller | |
| 2010/0280962 A1 | 11/2010 | Chan | |
| 2010/0332389 A1* | 12/2010 | Al-Sahli | G06Q 20/1085 705/43 |
| 2011/0010203 A1 | 1/2011 | Wottowa et al. | |
| 2011/0022517 A1 | 1/2011 | Hammad | |
| 2011/0029363 A1 | 2/2011 | Gillenson et al. | |
| 2011/0131096 A1 | 6/2011 | Frew et al. | |
| 2011/0137804 A1 | 6/2011 | Peterson | |
| 2011/0208629 A1 | 8/2011 | Benefield et al. | |
| 2011/0215921 A1* | 9/2011 | Ben Ayed | G08B 1/08 340/539.11 |
| 2011/0238582 A1 | 9/2011 | Dasari et al. | |

(56) References Cited

U.S. PATENT DOCUMENTS

| | | | |
|---|---|---|---|
| 2011/0251888 A1 | 10/2011 | Faith et al. | |
| 2011/0302083 A1 | 12/2011 | Bhinder | |
| 2012/0022944 A1 | 1/2012 | Volpi | |
| 2012/0029990 A1* | 2/2012 | Fisher | G06Q 20/105 705/14.19 |
| 2012/0140993 A1* | 6/2012 | Bruso | G06K 9/00899 382/118 |
| 2012/0166336 A1 | 6/2012 | Hartmaier | |
| 2012/0173431 A1* | 7/2012 | Ritchie | G06Q 20/367 705/65 |
| 2012/0185386 A1 | 7/2012 | Salama et al. | |
| 2013/0060692 A1 | 3/2013 | Typrin et al. | |
| 2013/0091042 A1 | 4/2013 | Shah et al. | |
| 2013/0124364 A1 | 5/2013 | Mittal | |
| 2013/0246260 A1 | 9/2013 | Barten et al. | |
| 2013/0246265 A1 | 9/2013 | Al-Sahli | |
| 2013/0290119 A1* | 10/2013 | Howe | G06Q 20/20 705/16 |
| 2014/0207672 A1* | 7/2014 | Kelley | G06Q 20/4014 705/42 |
| 2014/0214670 A1* | 7/2014 | McKenna | G06Q 20/40145 705/44 |
| 2014/0236792 A1 | 8/2014 | Pant et al. | |
| 2014/0279332 A1* | 9/2014 | Poole | G06Q 20/354 705/35 |
| 2014/0279490 A1* | 9/2014 | Calman | G06Q 20/40 705/43 |

OTHER PUBLICATIONS

International Preliminary Report on Patentability and Written Opinion dated Aug. 28, 2012 for International Application No. PCT/US2011/026119.

Janet Bigham Bernstel, "One-Two Marketing Punch!", ABA Bank Marketing, Oct. 2002, vol. 34, Issue 8, p. 16, 6p.

John Adams, "CRM: Keep 'Em Coming Back; Consumer onboarding's never been more important, or automated", Bank Technology News, May 2009, vol. 22, Issue 5, p. 1.

Melanie Scarborough, "Keeping New Customers on Board", Community Banker, Nov. 2008, vol. 17, Issue 11, p. 20.

Chris Costanzo, "Maximizing Marketing With E-mail, YouTube", Community Banker [serial online], Apr. 2009, vol. 18, Issue 4, p. 34-38.

Tanja Lian Sablosky, "How to Lure Them Online", ABA Bank Marketing, Sep. 2003, vol. 35, Issue 7, p. 28-31, 4p, 1 Color Photograph.

The Point Staff, "How to Control the Costs of Online Banking Support", Point for Credit Union Research & Advice, Dec. 22, 2003, pN.PAG, 0p.

James Swann, "Online Bill Pay: Getting Customers to Use It", Community Banker, Nov. 2004, vol. 13, Issue 11, p. 42-47, 5p.

Chris Costanzo, "you've got customers!", Community Banker, Dec. 2007, vol. 16, Issue 12, p. 34-37, 4p.

Diana Tummillo, "A Way to Grow Core Deposits", ABA Bank Marketing, Sep. 2006, vol. 38, Issue 7, p. 40-43, 4p.

International Search Report for International Application No. PCT/US2009/051121dated Aug. 26, 2009.

Terry Sweeney, "SIS Taps Mobiles To Reduce Credit Fraud", Mar. 5, 2008, http://www.informationweek.com/sis-taps-mobiles-to-reduce-credit-fraud/206901958.

mConfirm—Fraud Management Solutions for Credit Card Issuers, http://www.mconfirm.com, May 13, 2008.

"Security System Matches Card Purchase to Cellphone Location", ePaynews, the Payment News and Resource Center, http://www.epaynews.com/index.cgi?survey=false&keywords=&optional=7subject=Banking%20, May 13, 2008.

* cited by examiner

RESTRICTED ACCESS TO ONLINE BANKING

FIELD OF THE INVENTION

The present invention embraces a system for restricting access to a customer's mobile and online banking account based on defined online-banking access restrictions. The system typically includes a processor, a memory, and an online banking module stored in the memory. The online banking module is typically configured to restrict access to the customer's online banking account based on defined online-banking access restrictions.

BACKGROUND

Over the last few years, the use of online banking (e.g., mobile banking) has increased dramatically. Online banking provides users with many useful features that typically include, among other things, allowing users to view account balances, view transaction history, view statements, transfer funds, and pay bills. That said, a need exists for users to have increased control over their online banking accounts.

SUMMARY

In one aspect, the present invention embraces a method for restricting access to a customer's online banking account based on customer-defined online-banking access restrictions. The present invention also embraces a system (e.g., an online banking system) configured for performing one or more of the steps of the method.

The method typically includes, initially, receiving an association request from a customer to associate a first mobile device with the customer's online banking account. The association request typically includes device identification information associated with the first mobile device and first account identification information associated with the customer's online banking account. Next, the device identification information associated with the first mobile device is associated with the customer's online banking account, and an association record based on the device identification information associated with the first mobile device and the first account identification information associated with the customer's online banking account is created.

Subsequently, a first restricted transaction definition is typically received from the first mobile device. The first restricted transaction definition typically defines a first restricted transaction associated with the customer's online banking account. A database of records is then searched to determine if the first mobile device is associated with the customer's online banking account. A first restricted transaction record is created based on determining that the first mobile device is associated with the customer's online banking account, the first restricted transaction record including the first restricted transaction definition.

Later, it is determined that a computing device has initiated a first online banking transaction associated with the customer's online banking account. A database of records is searched to determine if the first online banking transaction is within the first restricted transaction definition. The first online banking transaction is denied based on determining that the first online banking transaction is within the first restricted transaction definition.

Another method for restricting access to a customer's online banking account includes, initially, receiving an association request from a customer to associate a first mobile device with the customer's online banking account. The association request typically includes device identification information associated with the first mobile device and first account identification information associated with the customer's online banking account. Next, the device identification information associated with the first mobile device is associated with the customer's online banking account, and an association record based on the device identification information associated with the first mobile device and the first account identification information associated with the customer's online banking account is created.

Subsequently, it is determined that a computing device has initiated a first online banking transaction associated with the customer's online banking account. A database of records is searched to determine if the first online banking transaction is within a first restricted transaction definition. Device identification information associated with the computing device is received and a database of records is searched to determine if the computing device is associated with the customer's online banking account. Geographic location information associated with the computing device and geographic location information associated with the first mobile device are received. If the first online banking transaction is within a first restricted transaction definition and if the computing device is not associated with the customer's online banking account, it is determined whether the geographic location information associated with the computing device is geographically proximate to a predefined location and/or whether the geographic location information associated with the computing device is geographically proximate to the geographic location information associated with the first mobile device. The online banking transaction is denied if the geographic location information associated with the computing device is not geographically proximate to the predefined location and if the geographic location information associated with the computing device is not geographically proximate to the geographic location information associated with the first mobile device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
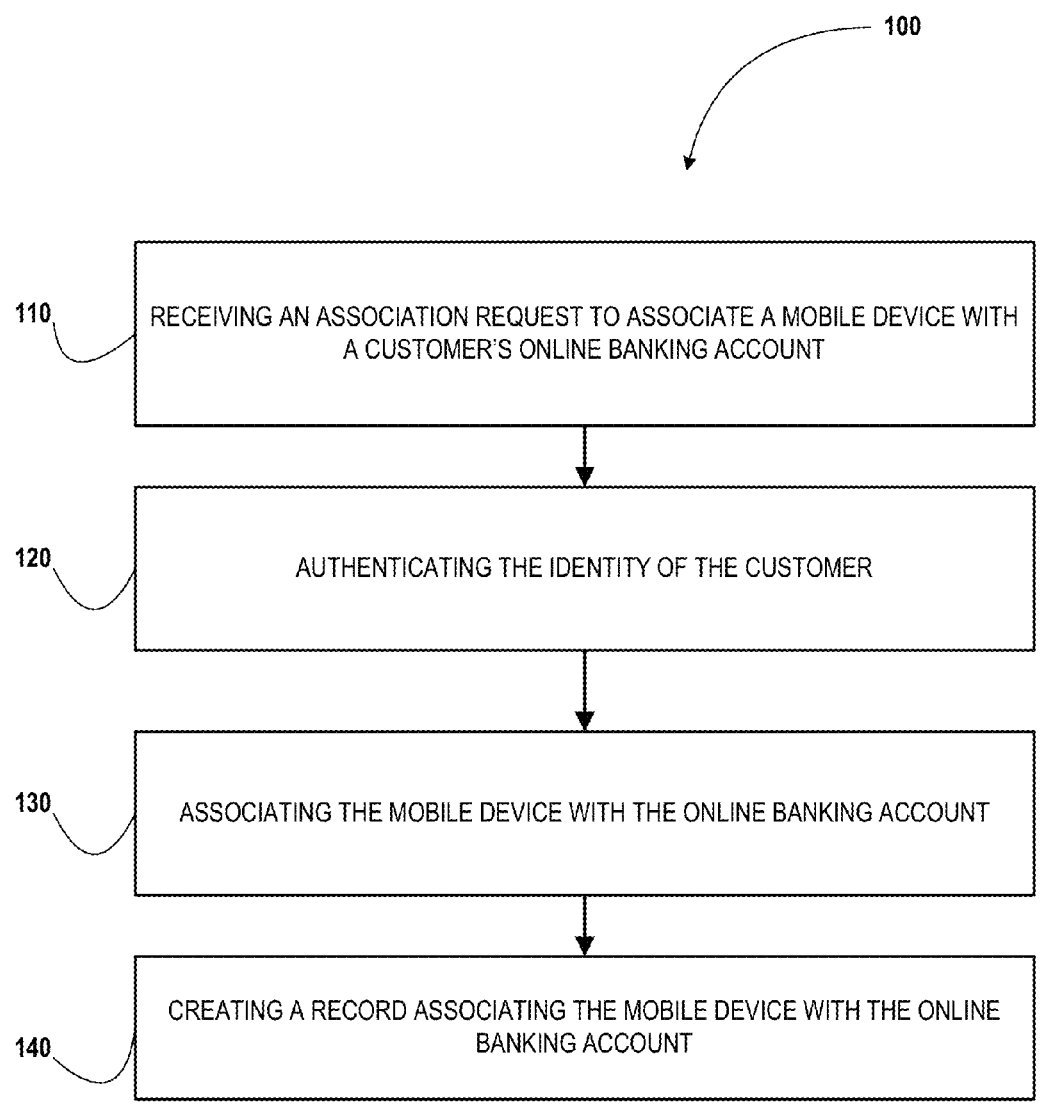
Figure 2A:
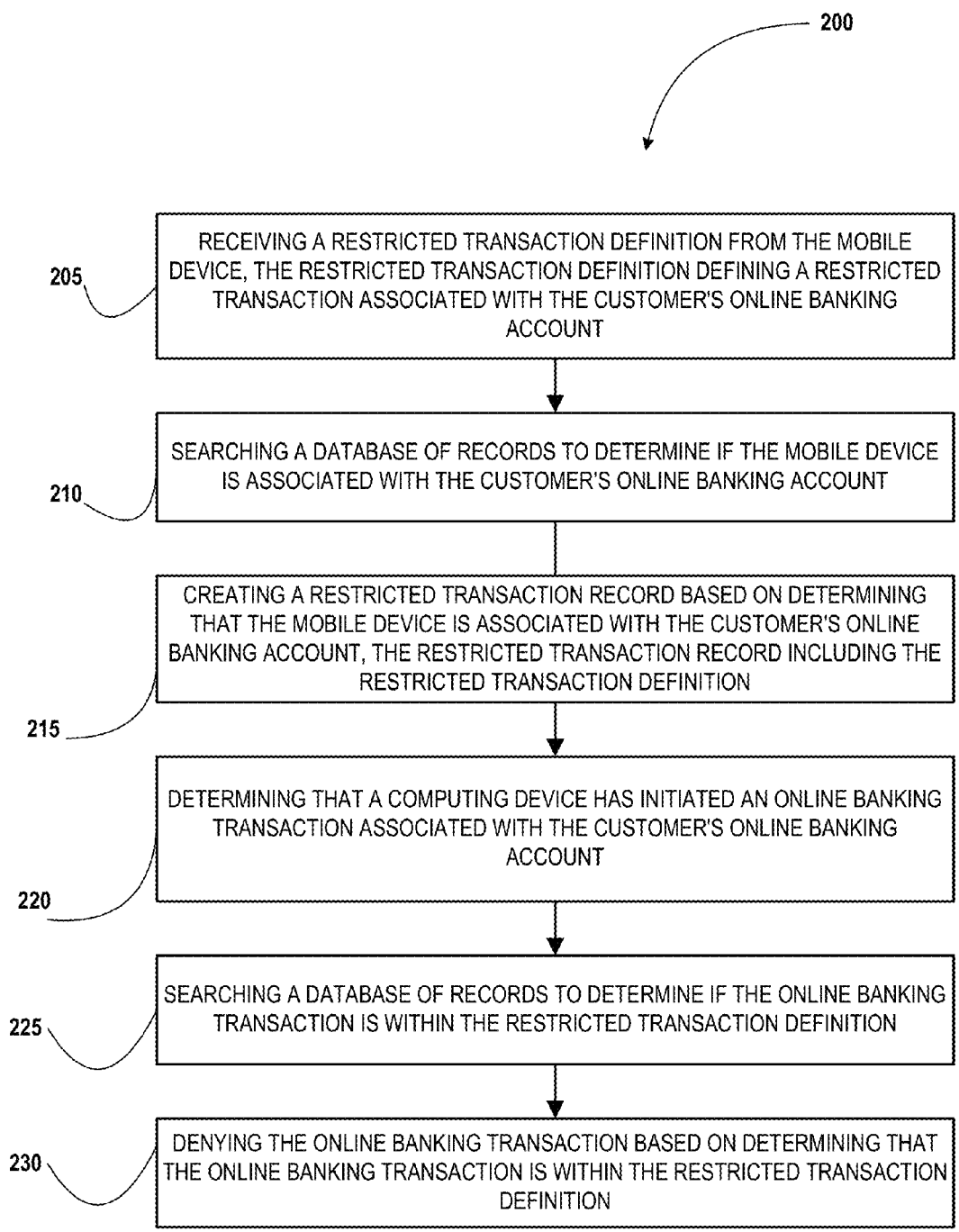
Figure 2B:
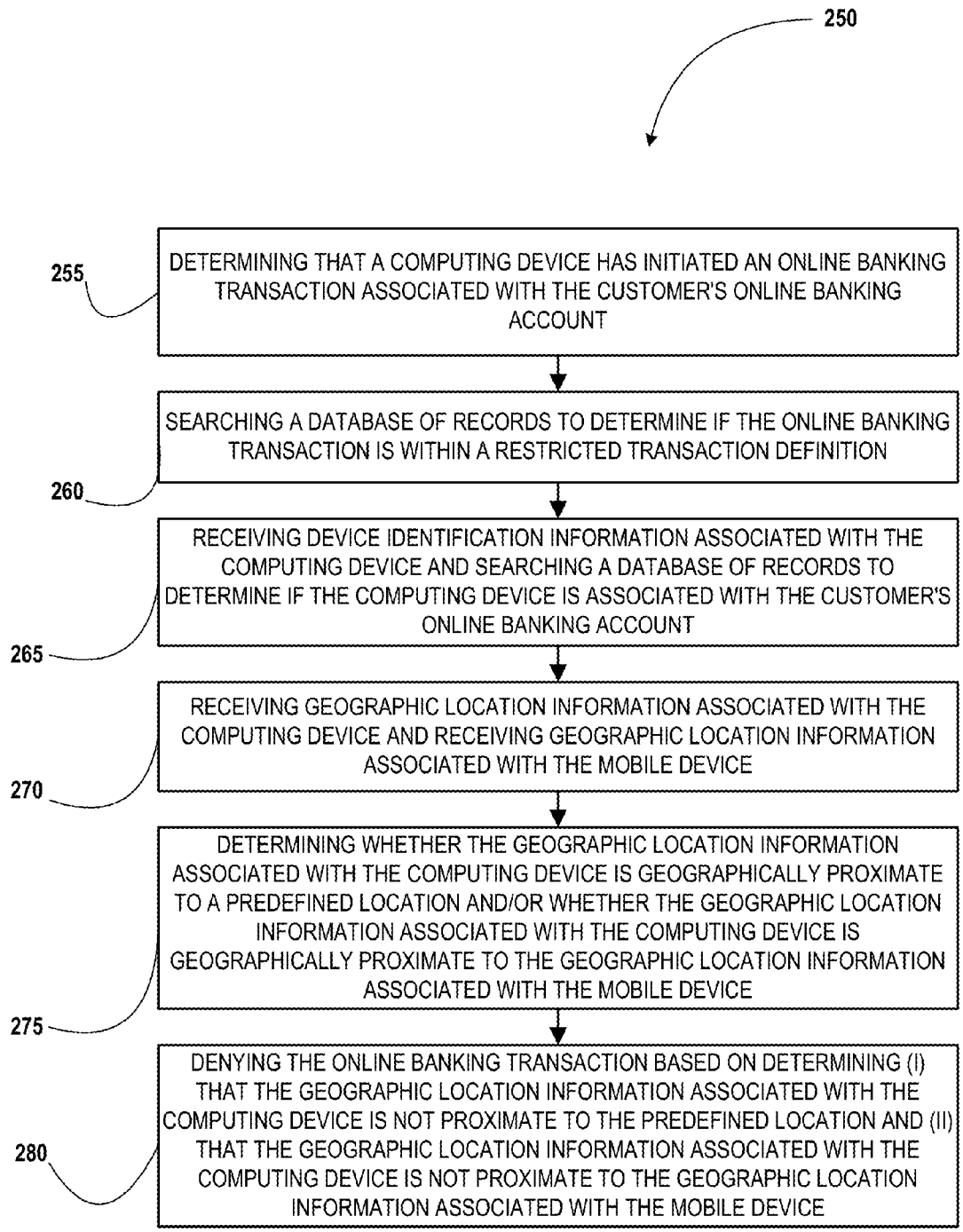
Figure 3:
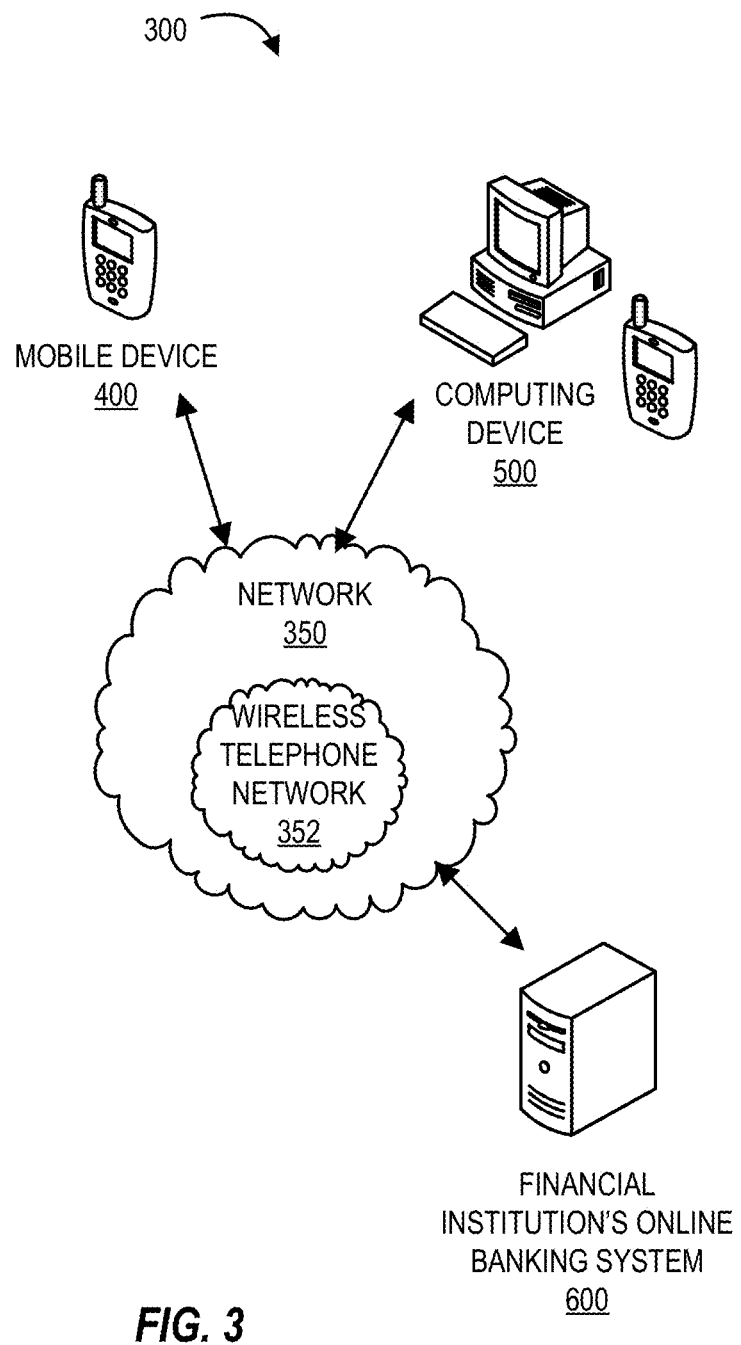
Figure 4:
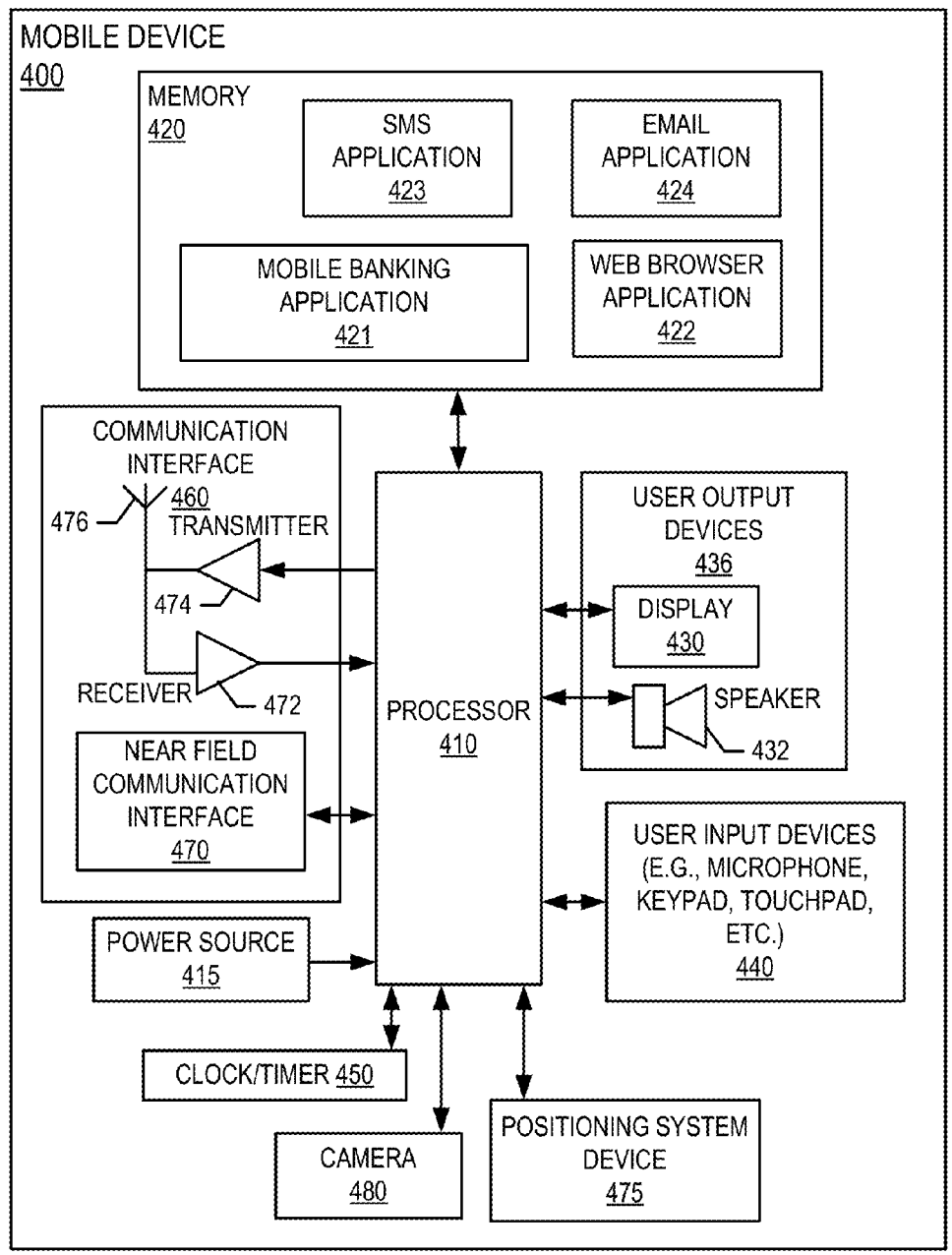
Figure 5:
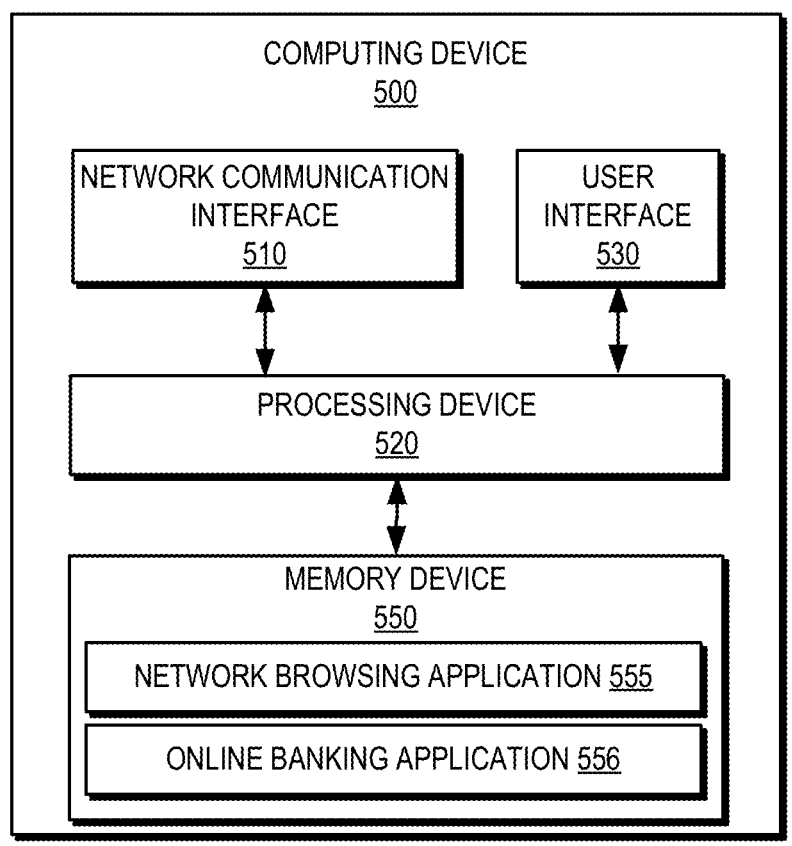
Figure 6:
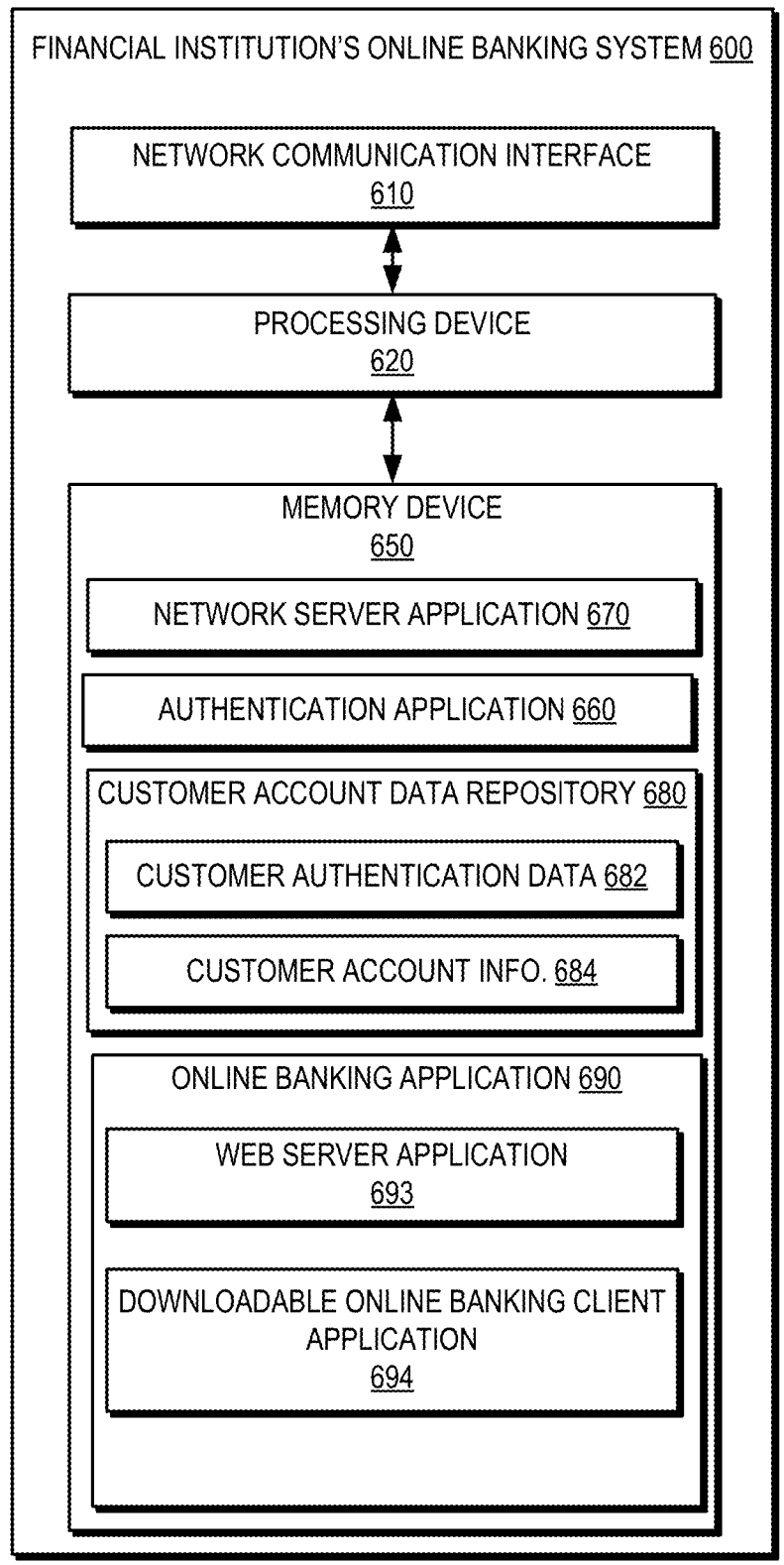

Having thus described embodiments of the invention in general terms, reference will now be made the accompanying drawings, wherein:

FIG. 1 depicts a method for enrolling a customer's mobile device with the customer's online banking account in accordance with an aspect of the present invention;

FIG. 2A depicts a method for restricting access to a customer's online banking account based on a customer-defined online-banking access restriction in accordance with an aspect of the present invention;

FIG. 2B depicts a method for restricting access to a customer's online banking account in accordance with another aspect of the present invention;

FIG. 3 depicts an online banking system and environment in accordance with an aspect of the present invention;

FIG. 4 schematically depicts a customer's mobile device in accordance with an aspect of the present invention;

FIG. 5 schematically depicts a customer's computing device in accordance with an aspect of the present invention; and FIG. 6 schematically depicts an online banking system in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

As used herein, an "online banking account" is an account that is associated with one or more user accounts at a financial institution. For example, the user may have an online banking account that is associated with the user's checking account, savings account, investment account, and credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). In other embodiments, the "customer" may refer to the user.

In one aspect, the present invention generally relates to a system (e.g., an online banking system) for restricting access to a customer's online banking account (e.g., the customer's mobile banking account). These access restrictions may be defined by the customer (e.g., by using a mobile device associated with the customer's online banking account). Alternatively, these access restrictions may be defined by another entity, such as a financial institution.

Referring now to FIG. 1, a general process flow 100 is provided for enrolling (e.g., associating) a customer's mobile device with an online banking account. This method is typically performed by an online banking system. Although enrolling a mobile device is discussed below, it is within the scope of the present invention to enroll other computing devices such as a personal computer.

At block 110, the method includes receiving (e.g., at an online banking system) an association request to associate (e.g., enroll) the mobile device (e.g., a laptop, personal digital assistant (PDA), cell phone, smart phone, tablet, mp3 player, or any other suitable electronic device) with the customer's online banking account. The association request may be submitted by the mobile device via a mobile application (e.g., a mobile banking application) or via a mobile banking website. For example, a mobile banking application downloaded onto the mobile device may prompt the customer to enroll the mobile device as an online banking remote control.

The association request typically includes device identification information associated with the mobile device and account identification information associated with the customer's online banking account.

The device identification information associated with the mobile device may be any information sufficient to generate a device "fingerprint," or unique signature of the customer's mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device authentication information. In some embodiments, device identification information may need to be entered manually at the mobile device. For example, the online banking system may prompt the customer for manual entry of the device identification information (e.g., a serial number, an identification code, an International Mobile Station Equipment Identity (IMEI), a phone number, a removable part, a chip, or similar pieces of device identification information). In other embodiments, device identification information may not be based on user input received at the mobile device. Instead, the device identification information may be automatically provided by the mobile device. In yet another embodiment, the mobile device may provide the information without requiring user input after receiving a request from the online banking system for the identification information.

The account identification information may be any information sufficient to identify the customer's online banking account. In some embodiments, the account identification information may include, but is not limited to, at least one of a customer name, contact information, a username, a password, a PIN number, a unique identification number associated with the customer, social network information, an account number, or a card number. In some embodiments, the account identification information may be proprietary to the financial institution, such as an account number, a reference number to an account, a client number, or the like. In other embodiments, the account identification information may be public information, such as a phone number, mailing address, email address, or the like. The account identification information may be automatically provided by the mobile device. Alternatively, the customer may manually provide this information. For example, the customer may enter a username and a password associated with the customer's online banking account. The username and password may be provided in conjunction with the association request or may have been previously provided at the beginning of an online banking session, such as a mobile banking session (e.g., in order to log into a mobile banking application or mobile banking website). Accordingly, the account identification information may include information related to an online banking session (e.g., a mobile banking session).

At block 120, the method typically includes authenticating the identity of the customer. For example, the online banking system may prompt the customer to enter authentication information (e.g., customer identification information) such as a username, a password, a personal identification number (PIN), a passcode, biometric information (e.g., voice authentication, a fingerprint, and/or a retina scan), or an answer to a security question. This authentication information may be used to authenticate the identity of the customer (e.g., determine that the authentication information is associated with the account) and determine that the customer has authority to access the online banking account. In one embodiment, authentication information may include a unique intrinsic user activity, such as making a predefined motion with a customer device. Using a unique intrinsic user activity for authentication is described in commonly assigned U.S. Pat. No. 8,116,453, which is hereby incorporated by reference in its entirety. In some embodiments, this step 120 of authenticating the identity of the customer may be part of a strong authentication process. A strong authentication process is a security measure that requires two or more authentication steps. In this regard, the customer may have previously provided a username and password when initiating a mobile banking session (e.g., when submitting an online banking session initiation request) or when submitting the association request. Accordingly, in step 120, the customer may be prompted to enter additional authentication information (e.g., additional identification information), such as a PIN, biometric information, and/or an answer to a security question in order to further verify the identity of the customer (e.g., determine that the additional authentication information is associated with the online banking account).

At block 130, the mobile device is associated (e.g., enrolled) with the customer's online banking account. In this regard, the account identification information and customer identification information provided by the customer is typically used to locate records (e.g., customer account information) in the online banking system associated with the customer's online banking account. Once the records associated with the customer's online banking account are located, an association is made between the identity of the mobile device and the customer's online banking account. Once the association is made, at block 140, the online banking system typically creates an association record in memory of the association between the identity of the mobile device and the customer's online banking account.

In one embodiment, this association between the identity of the mobile device and the customer's online banking account indicates that the mobile device has permission to define access restrictions to the customer's online banking account. Furthermore, this association between the mobile device and the customer's online banking account may be used to associate the mobile device with the customer's identity. Accordingly, the identity of the mobile device may be used to identify the customer and to identify the customer's online banking account.

In this regard, FIG. 2A depicts a method 200 for restricting access to a customer's online banking account based on customer-defined online-banking access restrictions. This method is typically performed by an online banking system. Although the following method describes the online-banking access restrictions as being provided by an enrolled (e.g., associated) mobile device, it is within the scope of the present invention for the access restrictions to be defined through any computing or mobile device. Furthermore, although the following method describes the online-banking access restrictions as being defined by the customer, it is within the scope of the present invention for the online-banking access restrictions to be defined by another entity (e.g., by the financial institution associated with the customer's online banking account).

At block 205, the method includes receiving a restricted transaction definition from the mobile device. The mobile device may use a mobile application (e.g., a mobile banking application) or a mobile banking website in order to send the restricted transaction definition (e.g., to an online banking system). The online banking system may be configured so that the mobile banking application or mobile banking website displays a graphical user interface that allows the customer to select and provide values related to one or more parameters in order to create a customized restricted transaction definition. The graphical user interface may also include a button for submitting a restricted transaction definition. Once the appropriate button is pressed, the mobile device may automatically use the mobile banking application or mobile banking website to transmit a suitable restricted transaction definition to the online banking system.

The restricted transaction definition defines one or more restricted transactions associated with the customer's online banking account. The restricted transaction may be any activity that may be initiated, performed, and/or completed using the customer's online banking account. By way of example, the restricted transaction may be initiating an online banking session, terminating an online banking session, paying bills, viewing account statements, viewing account balances, depositing funds, withdrawing funds, or transferring funds (e.g., transferring funds to a predefined transferee). For example, the restricted transaction definition may include funds transfer, but may not include viewing account balances. The restricted transaction may be any online banking transaction performed by a predefined computing device. The restricted transaction may be any online banking transaction performed or initiated by a device not associated (e.g., enrolled) with the customer's online banking account. The restricted transaction may be any online banking transaction that is not performed or initiated by the mobile device. The restricted transaction may be any online banking transaction performed or not performed from a predefined location (e.g., within a predefined distance from a predefined location or within a predefined geo-fence). For example, the restricted transaction may be any online banking transaction performed when the device performing the transaction is located or not located at a predefined location (e.g., within a predefined distance from a predefined location or within a predefined geo-fence). In this regard, many computing devices are capable of recognizing and transmitting the GPS coordinates for the position of the computing device. In some situations, a device may be capable of recognizing a network associated with a particular location, such as a customer's home or business wireless network, and use that information to transmit or otherwise make available the location information associated with the device. The restricted transaction may be any online banking transaction that performed or not performed on a predefined network (e.g., on or not on a particular cellular or wireless network, such as a particular local area network). The restricted transaction may be any online banking transaction performed during a predefined period of time (e.g., during a certain day or time of day). The restricted transaction may be any online banking transaction engaged in by a sub-account associated with the customer's online banking account. The restricted transaction may be any combination of the foregoing. It is within the scope of the present invention for there to be more than one restricted transaction definition.

In the event that the restricted transaction definition relates to online banking transactions performed by a predefined computing device, device identification information associated with the predefined computing device may be collected (e.g., automatically by the online banking system during an online banking session). For example, the online banking system may collect device identification information for each device that logs into the customer's online banking account. Thereafter, the online banking system may present a list of every device that has logged into the customer's online banking account to the customer (e.g., via the customer's mobile device) after which the customer can select one or more devices to restrict access.

Next, at block 210, the online banking system searches a database of records to determine if the mobile device is associated (e.g., enrolled) with the online banking account. In this regard, the mobile device may provide device identification information associated with the mobile device to the online banking system so that the online banking system can determine if the mobile device is associated with the customer's online banking account.

If the mobile device is associated with the online banking account, then, at block 215, a restricted transaction record is created (e.g., in a database). The restricted transaction record includes the restricted transaction definition that was received from the mobile device. If the mobile device is not associated with the online banking account, then the restricted transaction definition may be rejected and an error message may be sent to the mobile device.

Later, at block 220 it is determined that a computing device (e.g., a laptop, personal computer, tablet computer, mobile device, or other suitable electronic device) has initiated an online banking transaction associated with the customer's online banking account. The computing device may use a mobile application (e.g., a mobile banking application) or a mobile banking website in order to initiate the online banking transaction. For example, a mobile banking application downloaded onto the computing device may be used to engage in the online banking transaction.

At block 225, the method includes searching a database of records to determine if the online banking transaction is within a restricted transaction definition. In this regard, the online banking system may compare the online banking transaction against the one or more restricted transactions to determine if such online banking transaction is within the scope of a restricted online banking transaction.

If the computing device has initiated an online banking transaction that is with a restricted transaction definition, then, at block 230, the online banking system typically denies (e.g., prevents) the online banking transaction from being completed. For example, the computing device may be preventing from logging onto the customer's online banking account. By way of further example, the computing device may be permitted to initiate an online banking session and engage in certain transactions, but may be prevented from engaging in other transactions (e.g., transferring funds).

If the online banking transaction is not within a restricted transaction definition, then the online banking system will typically complete the online banking transaction. Thus, certain online banking transactions may be permitted (e.g., viewing account balances or transactions that occur on a business computer during business hours), while other online banking transactions may be prevented (e.g., transferring funds or transactions that occur on a business computer outside of business hours).

In one embodiment, the method includes allowing and completing a restricted transaction if the computing device provides predefined authentication information. In a particular embodiment, a restricted transaction may be permitted if the computing device engaging in the restricted transaction is enrolled (e.g., associated) with the customer's online banking account. Thus, the restricted transaction would only be denied upon determining that computing device is not associated with the customer's online banking account. In another particular embodiment, a restricted transaction may be permitted if the user of the computing device provides at least two levels of authentication. For example, a restricted transaction may be denied if the computing device only provides a username and password associated with the customer's online banking account, but the restricted transaction may be permitted if the computing device provides a personal identification number or biometric identification information in addition to the username and password associated with the customer's online banking account. The required authentication information may be defined by the customer or by the financial institution. In this regard, it is thought that if the computing device is enrolled with the customer's account or if additional authentication is provided, then it is more likely that the user of the computing device is an authorized user.

In one embodiment, the method includes, upon determining that the online banking transaction is a restricted transaction and/or denying the online banking transaction, transmitting an alert to the mobile device. This alert typically includes an indication that the computing device has attempted to engage in a restricted transaction. This alert may be transmitted to the mobile device via a telephone call, an SMS message, an email message, a social media message, an instant message, an alert associated with a mobile banking application installed on the mobile device, or in any other suitable way.

In some embodiments, the online banking system may be configured to record and maintain the history of detected restricted online banking transactions. This history regarding the predefined online banking transactions may be displayed to the customer (e.g., upon request) via an online banking website or online banking application being accessed by the mobile device.

In one embodiment, the method includes receiving a request from the mobile device to remove the restricted transaction definition. The restricted transaction record associated with the restricted transaction definition may then be deleted (e.g., upon determining that the mobile device is associated with the customer's online banking account).

FIG. 2B depicts a method 250 for restricting access to a customer's online banking account in accordance with another embodiment of the present invention.

At block 255, the method includes determining that a computing device (e.g., a laptop, personal computer, tablet computer, mobile device, or other suitable electronic device) has initiated an online banking transaction associated with the customer's online banking account. The computing device may use a mobile application (e.g., a mobile banking application) or a mobile banking website in order to initiate the online banking transaction. For example, a mobile banking application downloaded onto the computing device may be used to engage in the online banking transaction.

Next, at block 260, the method includes searching a database of records to determine if the online banking transaction is within a restricted transaction definition. In this regard, the online banking system may compare the online banking transaction against the one or more restricted transactions to determine if such online banking transaction is within the scope of a restricted online banking transaction.

The restricted transaction definition defines one or more restricted transactions associated with the customer's online banking account. The restricted transaction may be any activity that may be initiated, performed, and/or completed using the customer's online banking account. By way of example, the restricted transaction may be initiating an online banking session, terminating an online banking session, paying bills, viewing account statements, viewing account balances, depositing funds, withdrawing funds, or transferring funds (e.g., transferring funds to a predefined transferee). For example, the restricted transaction definition may include funds transfer, but may not include viewing account balances. The restricted transaction may be any online banking transaction performed by a predefined computing device. The restricted transaction may be any online banking transaction performed during a predefined period of time (e.g., during a certain day or time of day). The restricted transaction may be any online banking transaction engaged in by a sub-account associated with the customer's online banking account. The restricted transaction may be any combination of the foregoing. The restricted transaction definition may be defined by the customer (e.g., using an enrolled device) or by the financial institution. It is within the scope of the present invention for there to be more than one restricted transaction definition.

At block 265, the method includes receiving device identification information associated with the computing device from the computing device. The online banking system typically then uses this device identification information to search a database of records to determine if the computing device is enrolled (e.g., associated) with the online banking account.

If the computing device is associated with the online banking account or if the online banking transaction is not a restricted transaction (e.g., within a restricted transaction definition), then the online banking transaction may be completed (e.g., by the online banking system). In this regard, it is thought that if the computing device is enrolled with the customer's online banking account, then a user of the computing device engaging in a restricted online banking transaction is more likely to be an authorized user.

If the computing device is not associated with the online banking account and if the online banking transaction is a restricted transaction, then, at block 270, the method typically includes receiving geographic location information associated with the computing device and geographic location information associated with the mobile device. This geographic location information may be any information that is suitable for determining the location of the computing device and/or the mobile device. For example, this geographic location information may be GPS coordinates or information related to a detected wireless network (e.g., a local area network) that is transmitted by both the mobile device and the computing device. In one embodiment, the geographic location information may be information associated with the computing device and/or the mobile device being in close proximity with another device or one another (e.g., determined using an NFC interface or other proximity detector).

Next, at block 275, the method includes determining whether the geographic location information associated with the computing device is geographically proximate to a predefined location and/or whether the geographic location information associated with the computing device is geographically proximate to the geographic location information associated with the mobile device. This step is typically only performed if the computing device is not associated with the online banking account and if the online banking transaction is a restricted transaction.

The predefined location may be defined by the financial institution. Alternatively, the predefined location may have been defined by the customer (e.g., by employing an online banking application or online banking website). The predefined location may be location information for geographic locations proximate to the customer's home, business, workplace, and/or usual corridor of travel. This location information may include the address, GPS coordinates, longitude and latitude, location name, and/or any other information sufficient to identify locations proximate to the customer's home, business, workplace, and/or usual corridor of travel. In some embodiments, the location information may include one or more geo-fences that reflect geographic locations proximate to the customer's home, business, workplace, and/or usual corridor of travel. A geo-fence is a virtual perimeter that defines the boundaries of an actual geographic area. In some embodiments, locations proximate the customer's usual corridor of travel may be determined by analyzing the location history of a mobile device associated with the authorized customer (e.g., by analyzing the GPS coordinates transmitted by the mobile device over a period of time). In other embodiments, locations proximate to the customer's usual corridor of travel may be determined by analyzing the location information associated with one or more previously approved transactions (e.g., online banking transactions) associated with the customer. It is thought that geographic location information associated with the customer's mobile device or the customer's previous transactions reflect the usual corridor of travel of the customer. In some embodiments, the location information associated with a predefined location may be identification information associated with a wireless network (e.g., a wireless network associated with the customer's home or business).

In some exemplary embodiments, determining whether the geographic location information associated with the computing device is geographically proximate to the predefined location includes determining whether the geographic location information associated with the computing device is within a geo-fence associated with the predefined location.

In some exemplary embodiments, determining whether the geographic location information associated with the computing device is geographically proximate to the predefined location includes determining whether the location information associated with the computing device is located within a predefined distance from the predefined location. It will be appreciated that any approach to determining that the computing device is located within a predetermined distance from the predefined location may be used. For example, a computer processor may compare the GPS coordinates associated with the computing device with the GPS coordinates associated with the predefined location and calculate a distance. The predefined distance may be a few meters, tens of meters, or an even larger distance. The predetermined distance is somewhat influenced by the margin of error associated with the relating to the location of the computing device to the location associated with the predefined location. The more accurate the location information, the tighter range that can be selected for the predefined distance.

In some exemplary embodiments, determining whether the geographic location information associated with the computing device is geographically proximate to the predefined location includes determining whether the computing device is in communication with a predefined wireless network (e.g., a local area network associated with a predefined location)

In some exemplary embodiments, determining whether the geographic location information associated with the computing device is geographically proximate to the geographic location information associated with the mobile device includes determining whether the geographic location information associated with the computing device is within a predefined distance from the geographic location information associated with the mobile device. The predefined distance may be any distance sufficient to establish a likelihood that the mobile device and the computing device are in close proximity.

In some exemplary embodiments, determining whether the geographic location information associated with the computing device is geographically proximate to the geographic location information associated with the mobile device includes determining if the computing device and the mobile device are in communication with the same wireless network, such as the same local area network (e.g., a predefined local area network).

In some exemplary embodiments, determining whether the geographic location information associated with the computing device is geographically proximate to the geographic location information associated with the mobile device includes determining whether the computing device and the first mobile device are in communication with one another via Near Field Communication (NFC). In this regard an NFC interface on the mobile device and an NFC interface on the computing device may exchange information. Information regarding this exchange of information via Near Field Communication may then be provided to the Online Banking System to establish that the mobile device and the computing device are in close proximity.

If the geographic location information associated with the computing device is not proximate to the predefined location and if the geographic location information associated with the computing device is not proximate to the geographic location information associated with the mobile device, then, at block 280, the online banking transaction is denied (e.g., by the online banking system).

That said, the online banking transaction may be completed if it is determined that the geographic location information associated with the computing device is geographically proximate to the predefined location. In addition, the online banking transaction may be completed if it is determined that the geographic location information associated with the computing device is geographically proximate to the geographic location information associated with the first mobile device. In this regard, it is thought that if the computing device is co-located with the enrolled mobile device or if the computing device is at a predefined location associated with the customer's home, business, workplace, or usual corridor of travel, then the user of the computing device engaging in the online banking transaction is more likely to be an authorized user. Thus an additional layer of security for restricted transactions can be provided.

FIG. 3 provides a block diagram illustrating an online banking system 600 and environment 300, in accordance with an embodiment of the present invention. As illustrated in FIG. 3, the online banking environment 300 includes a mobile device 400 associated with an online banking customer and a computing device 500. The computing device may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, a tablet computer, a laptop, or other mobile device.

The mobile device 400 and the computing device 500 are typically configured to communicate over a network 350 with a financial institution's online banking system 600. The mobile device 400, the computing device 500, and the financial institution's online banking system 600 are each described in greater detail below with reference to FIGS. 4-6. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352.

In general, the mobile device 400 is configured to connect with the network 350 to log the customer into an online banking system 600. The online banking system 600 involves authentication of the customer in order to access the customer's account on the online banking system 600. For example, the online banking system 600 is a system where the customer logs into his/her account such that the customer can access data that is associated with the customer. For example, in one embodiment of the invention, the system 600 may be an online banking system maintained by a financial institution. In such an embodiment, the customer can use the mobile device 400 to log into the online banking system to access the customer's online banking account. Logging into the online banking system 600 generally requires that the customer authenticate his/her identity using a user name, a passcode, a cookie, a biometric identifier, a private key, a token, and/or another authentication mechanism that is provided by the customer to the online banking system 600 via the mobile device 400. As described above, the identity of the mobile device 400 may be used to authenticate the identity of the customer.

The financial institution's online banking system 600 is typically in network communication with other devices, such as the computing device 500, which may be configured to communicate with the network 350 to also log the customer into the online banking system 600. In one embodiment, an application download server may be used to download software applications that support the online banking system 600 to the mobile device 400 and/or computing device 500.

In some embodiments of the invention, the application download server is configured to be controlled and managed by one or more third-party data providers (not shown in FIG. 3) over the network 350. In other embodiments, the application download server is configured to be controlled and managed over the network 350 by the same entity that maintains the online banking system 600.

FIG. 4 provides a block diagram illustrating the mobile device 400 of FIG. 3 in more detail, in accordance with embodiments of the invention. In one embodiment of the invention, the mobile device 400 is a mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned.

The mobile device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 350. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 352. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the mobile device 400. In some embodiments, the NFC interface 470 is not supported in and/or on the mobile device 400, but the NFC interface 470 is otherwise operatively connected to the mobile device 400 (e.g., where the NFC interface 470 is a peripheral device plugged into the mobile device 400). Other apparatuses having NFC interfaces mentioned herein may be configured similarly. In some embodiments, the NFC interface 470 of the mobile device 400 is configured to contactlessly and/or wirelessly communicate information to and/or from a corresponding NFC interface of another apparatus (e.g., another mobile or computing device).

The mobile device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device 400 to receive data from a user such as the customer, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a location to determine that the mobile device 400 is located proximate these known devices.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the mobile device 400 described herein. For example, the memory 420 may include such applications as a conventional web browser application 422 and/or a mobile banking application 421. These applications also typically provide a graphical user interface (GUI) on the display 430 that allows the customer to communicate with the consumer mobile device 400, the online banking system 600, and/or other devices or systems. In one embodiment of the invention, when the customer decides to enroll in the online banking program, the customer downloads or otherwise obtains the mobile banking system client application from the online banking system 600 or from a distinct application server. In other embodiments of the invention, the customer interacts with the online banking system 600 via the web browser application 422 in addition to, or instead of, the mobile banking application 421. The online banking system 600 is typically configured to present a graphical user interface (e.g., through a mobile banking application or mobile banking website) that allows the customer to use the mobile device 400 to control access to the customer's online banking account. In this regard, the graphical user interface may allow the customer to define one or more online-banking access restrictions.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information.

Referring now to FIG. 5, the computing device 500 also includes various features, such as a network communication interface 510, a processing device 520, a user interface 530, and a memory device 550. The network communication interface 510 includes a device that allows the personal computing device 500 to communicate over the network 350 (shown in FIG. 3). In one embodiment of the invention, a network browsing application 555 provides for a user to establish network communication with the online banking system 600 (shown in FIG. 3) for the purpose accessing a customer's online banking account. In another embodiment, an online banking application 556 allows the user of the computing device 500 to a customer's online banking account. In addition, the online banking application 556 may be configured to transmit location information associated with the computing device to the online banking system 600. Accordingly, the computing device 500 may include any suitable positioning system device (e.g., a GPS transceiver) for determining the location of the computing device 500. Furthermore, the computing device 500 may be configured to transmit information about the wireless communication network that it is on to the online banking system 600. The computing device 500 may also include a Near Field Communication (NFC) interface.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a customer to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the customer or output data to the customer.

These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

FIG. 6 provides a block diagram illustrating the online banking system 600 in greater detail, in accordance with an embodiment of the invention. As illustrated in FIG. 6, in one embodiment of the invention, the online banking system 600 includes a processing device 620 operatively coupled to a network communication interface 610 and a memory device 650. In certain embodiments, the online banking system 600 is operated by a financial institution, while in other embodiments, the online banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the online banking system 600 described herein. For example, in one embodiment of the online banking system 600, the memory device 650 includes, but is not limited to, a network server application 670, an authentication application 660, a customer account data repository 680 which includes customer authentication data 680 and customer account information 684, an online banking application 690 which includes a web server application 693, a downloadable online banking client application 694, and other computer-executable instructions or other data. The computer-executable program code of the network server application 670, the authentication application 660, or the online banking application 690 may instruct the processing device 620 to perform certain logic, data-processing, and data-storing functions of the online banking system 600 described herein, as well as communication functions of the online banking system 600.

In one embodiment, the customer account data repository 680 includes customer authentication data 682 and customer account information 684. The network server application 670, the authentication application 660, and the online banking application 690 are configured to implement customer account information 684 and the customer authentication data 682 (e.g., customer identification information) when authenticating a customer to the online banking system 600. In this regard, the customer authentication data 682 may include a customer's username, password, PIN number, and device identification information associated with an enrolled mobile device. The customer account information 684 may include account identification information, association records related to one or more enrolled mobile devices.

As used herein, a "communication interface" typically includes a modem, server, transceiver, and/or other device for communicating with other devices on a network, and/or a user interface for communicating with one or more customers. Referring again to FIG. 6, the network communication interface 610 is a communication interface having one or more communication devices configured to communicate with one or more other devices on the network 350, such as the mobile device 400, the computing device 500, and the online banking system 600. The processing device 620 is typically configured to use the network communication interface 610 to transmit and/or receive data and/or commands to and/or from the other devices connected to the network 350.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

To supplement the present disclosure, this application further incorporates entirely by reference the following commonly assigned patent applications: U.S. patent application Ser. No. 13/946,183 (now published as U.S. Patent Publication No. 2015/0026025) for a "Remote Control for Online Banking," filed Jul. 19, 2013; U.S. patent application Ser. No. 13/946,304 now published as U.S. Patent Publication No. 2015/0026053) for "Online Banking Alerts," filed Jul. 19, 2013; U.S. patent application Ser. No. 13/946,511 (now published as U.S. Patent Publication No. 2015/0026054) for "Customer-Defined Online Banking Access Restrictions," filed Jul. 19, 2013; U.S. patent application Ser. No. 13/946,519 (now published as U.S. Patent Publication No. 2015/0026055) for "Offline Mobile Banking," filed Jul. 19, 2013; U.S. patent application Ser. No. 13/946,570 now published as U.S. Patent Publication No. 2015/0026056) for "Completing Mobile Banking Transactions from Trusted Location," filed Jul. 19, 2013; U.S. patent application Ser. No. 13/946,581 (now published as U.S. Patent Publication No. 2015/0026057) for "Completing Mobile Banking Transaction with Different Devices," filed Jul. 19, 2013; U.S. patent application Ser. No. 13/946,425 now published as U.S. Patent Publication No. 2015/0026351) for an "Online Session Transfer," filed Jul. 19, 2013; and U.S. patent application Ser. No. 13/946,068 (now published as U.S. Patent Publication No. 2015/0026024) for "Systems for Managing Account Aggregators Access to Financial Account Information," filed Jul. 19, 2013.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for restricting access to a customer's online banking account, comprising:
   a computer apparatus including a processor and a memory; and
   an online banking module stored in the memory, executable by the processor and configured for:
      receiving an association request from the customer to associate a first mobile device with the customer's online banking account, the association request comprising device identification information of the first mobile device and first account identification information associated with the customer's online banking account;
      associating the device identification information of the first mobile device with the customer's online banking account and creating an association record based on the device identification information of the first mobile device and the first account identification information associated with the customer's online banking account;
      determining that a computing device has initiated a first online banking transaction associated with the customer's online banking account;
      searching a database of records to determine if the first online banking transaction is within a first restricted transaction definition;
      receiving device identification information of the computing device and searching a database of records to determine if the computing device is associated with the customer's online banking account;
      receiving geographic location information associated with the computing device, the geographic location information associated with the computing device comprising information related to a local area network connected to the computing device;

receiving geographic location information associated with the first mobile device, the geographic location information associated with the first mobile device comprising information related to a local area network connected to the first mobile device;

based on determining that the first online banking transaction is within a first restricted transaction definition and that the computing device is not associated with the customer's online banking account, determining whether the local area network connected to the computing device is a predefined local area network and whether the local area network connected to the computing device and the local area network connected to the first mobile device are the same local area network; and based on determining whether the local area network connected to the computing device is a predefined local area network and whether the local area network connected to the computing device and the local area network connected to the first mobile device are the same local area network, transmitting a command to the computing device, wherein the command causes the computing device to automatically log out of an active online banking session.

2. The system according to claim 1, wherein the online banking module is configured for transmitting the command to the computing device based on determining (i) that the local area network connected to the computing device is not the predefined local area network and (ii) that the local area network connected to the computing device and the local area network connected to the first mobile device are not the same local area network.

3. The system according to claim 1, wherein the online banking module is configured for:

receiving the first restricted transaction definition from the first mobile device;

receiving subsequent device identification information from the first mobile device;

searching the database of records to determine, based on the subsequent device identification information received from the first mobile device and the device identification information of the first mobile device associated with the customer's online banking account, if the first mobile device is associated with the customer's online banking account;

authenticating the customer based on determining that the first mobile device is associated with the customer's online banking account based on the subsequent device identification information received from the first mobile device;

creating a first restricted transaction record based on authenticating the customer, the first restricted transaction record comprising the first restricted transaction definition.

4. A computer program product for restricting access to a customer's online banking account, comprising a non-transitory computer-readable storage medium having computer-executable instructions for:

receiving an association request from the customer to associate a first mobile device with the customer's online banking account, the association request comprising device identification information of the first mobile device and first account identification information associated with the customer's online banking account;

associating the device identification information of the first mobile device with the customer's online banking account and creating an association record based on the device identification information of the first mobile device and the first account identification information associated with the customer's online banking account;

determining that a computing device has initiated a first online banking transaction associated with the customer's online banking account;

searching a database of records to determine if the first online banking transaction is within a first restricted transaction definition;

receiving device identification information of the computing device and searching a database of records to determine if the computing device is associated with the customer's online banking account;

receiving geographic location information associated with the computing device, the geographic location information associated with the computing device comprising information related to a local area network connected to the computing device;

receiving geographic location information associated with the first mobile device, the geographic location information associated with the first mobile device comprising information related to a local area network connected to the first mobile device;

based on determining that the first online banking transaction is within a first restricted transaction definition and that the computing device is not associated with the customer's online banking account, determining whether the local area network connected to the computing device is a predefined local area network and whether the local area network connected to the computing device and the local area network connected to the first mobile device are the same local area network; and based on determining whether the local area network connected to the computing device is a predefined local area network and whether the local area network connected to the computing device and the local area network connected to the first mobile device are the same local area network, transmitting a command to the computing device, wherein the command causes the computing device to automatically log out of an active online banking session.

5. The computer program product according to claim 4, wherein the non-transitory computer-readable storage medium has computer-executable instructions for transmitting the command to the computing device based on determining (i) that the local area network connected to the computing device is not the predefined local area network and (ii) that the local area network connected to the computing device and the local area network connected to the first mobile device are not the same local area network.

6. The computer program product according to claim 4, wherein the non-transitory computer-readable storage medium has computer-executable instructions for:

receiving the first restricted transaction definition from the first mobile device;

receiving subsequent device identification information from the first mobile device;

searching the database of records to determine, based on the subsequent device identification information received from the first mobile device and the device identification information of the first mobile device associated with the customer's online banking account, if the first mobile device is associated with the customer's online banking account;

authenticating the customer based on determining that the first mobile device is associated with the customer's online banking account based on the subsequent device identification information received from the first mobile device;

creating a first restricted transaction record based on authenticating the customer, the first restricted transaction record comprising the first restricted transaction definition.

7. A method for restricting access to a customer's online banking account, comprising:

receiving, with a computer processor, an association request from the customer to associate a first mobile device with the customer's online banking account, the association request comprising device identification information of the first mobile device and first account identification information associated with the customer's online banking account;

associating, with a computer processor, the device identification information of the first mobile device with the customer's online banking account and creating an association record based on the device identification information of the first mobile device and the first account identification information associated with the customer's online banking account;

determining, with a computer processor, that a computing device has initiated a first online banking transaction associated with the customer's online banking account;

searching, with a computer processor, a database of records to determine if the first online banking transaction is within a first restricted transaction definition;

receiving, with a computer processor, device identification information of the computing device and searching a database of records to determine if the computing device is associated with the customer's online banking account;

receiving, with a computer processor, geographic location information associated with the computing device, the geographic location information associated with the computing device comprising information related to a local area network connected to the computing device;

receiving, with a computer processor, geographic location information associated with the first mobile device, the geographic location information associated with the first mobile device comprising information related to a local area network connected to the first mobile device;

based on determining that the first online banking transaction is within a first restricted transaction definition and that the computing device is not associated with the customer's online banking account, determining, with a computer processor, whether the local area network connected to the computing device is a predefined local area network and whether the local area network connected to the computing device and the local area network connected to the first mobile device are the same local area network; and based on determining whether the local area network connected to the computing device is a predefined local area network and whether the local area network connected to the computing device and the local area network connected to the first mobile device are the same local area network, transmitting a command to the computing device, wherein the command causes the computing device to automatically log out of an active online banking session.

8. The method according to claim 7, comprising transmitting the command to the computing device based on determining (i) that the local area network connected to the computing device is not the predefined local area network and (ii) that the local area network connected to the computing device and the local area network connected to the first mobile device are not the same local area network.

9. The method according to claim 7, comprising:

receiving the first restricted transaction definition from the first mobile device;

receiving subsequent device identification information from the first mobile device;

searching the database of records to determine, based on the subsequent device identification information received from the first mobile device and the device identification information of the first mobile device associated with the customer's online banking account, if the first mobile device is associated with the customer's online banking account;

authenticating the customer based on determining that the first mobile device is associated with the customer's online banking account based on the subsequent device identification information received from the first mobile device;

creating a first restricted transaction record based on authenticating the customer, the first restricted transaction record comprising the first restricted transaction definition.

* * * * *